(12) United States Patent
Safaee-Rad et al.

(10) Patent No.: US 9,076,252 B2
(45) Date of Patent: Jul. 7, 2015

(54) IMAGE PERCEPTUAL ATTRIBUTE ADJUSTMENT

(71) Applicant: QUALCOMM Incorporated, San Diego, CA (US)

(72) Inventors: Reza Safaee-Rad, Etobicoke (CA); Milivoje Aleksic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 13/692,832

(22) Filed: Dec. 3, 2012

(65) Prior Publication Data

US 2013/0176326 A1 Jul. 11, 2013

Related U.S. Application Data

(60) Provisional application No. 61/583,416, filed on Jan. 5, 2012.

(51) Int. Cl.
*G09G 5/00* (2006.01)
*G09G 5/02* (2006.01)
*G09G 5/393* (2006.01)

(Continued)

(52) U.S. Cl.
CPC ............... *G06T 11/001* (2013.01); *H04N 5/44* (2013.01); *G06T 5/40* (2013.01); *G06T 3/4007* (2013.01); *G09G 5/393* (2013.01); *H04N 1/6027* (2013.01); *H04N 1/6019* (2013.01); *H04N 1/6058* (2013.01); *G06T 5/001* (2013.01); *G09G 5/02* (2013.01); *G09G 2320/0242* (2013.01); *G09G 2320/0666* (2013.01); *G09G 2320/0693* (2013.01); *G09G 2340/06* (2013.01)

(58) Field of Classification Search
USPC ......... 345/581, 589–590, 591, 593, 597, 600, 345/606, 616, 618, 619, 643–644, 690, 345/549; 348/241–242, 254–256, 552, 557, 348/560, 630; 358/518–519, 520, 523, 525, 358/533, 448, 463; 382/162, 167, 254, 260, 382/274, 276
See application file for complete search history.

(56) References Cited

U.S. PATENT DOCUMENTS 6,724,435 B2 4/2004 Segman
7,405,771 B2 7/2008 Lee et al.
(Continued)

FOREIGN PATENT DOCUMENTS

| EP | 0989757 A1 | 3/2000 |
| EP | 2244486 A2 | 10/2010 |
| JP | 2007228240 A | 9/2007 |

OTHER PUBLICATIONS

International Preliminary Report on Patentability from international application No. PCT/US2012/067750, mailed Mar. 12, 2014, 15 pp.

(Continued)

*Primary Examiner* — Wesner Sajous
(74) *Attorney, Agent, or Firm* — Shumaker & Sieffert, P.A.

(57) ABSTRACT

Techniques are described generally related to perceptual attribute adjustment. In some examples, the perceptual attribute adjustment may be performed by a color correction unit as part of the functionality of the color correction unit to correct deficiencies in the ability of a display to display particular colors. In this manner, the techniques may allow for current display processors to implement the described techniques without needing hardware modification.

23 Claims, 6 Drawing Sheets

(51) Int. Cl.
*H04N 1/60* (2006.01)
*H04N 5/445* (2011.01)
*G06T 3/40* (2006.01)
*G06T 5/00* (2006.01)
*G06T 11/00* (2006.01)
*H04N 5/44* (2011.01)
*G06T 5/40* (2006.01)

(56) References Cited

U.S. PATENT DOCUMENTS

| | | | |
|---|---|---|---|
| 2008/0240558 A1* | 10/2008 | Li et al. | 382/167 |
| 2008/0285851 A1 | 11/2008 | Wu et al. | |
| 2009/0268961 A1 | 10/2009 | Lu et al. | |
| 2011/0090351 A1* | 4/2011 | Cote et al. | 348/208.1 |
| 2011/0234622 A1 | 9/2011 | Fujita et al. | |
| 2012/0050563 A1* | 3/2012 | Cote et al. | 348/223.1 |
| 2013/0286242 A1* | 10/2013 | Cote et al. | 348/222.1 |
| 2013/0314435 A1* | 11/2013 | Sullivan et al. | 345/593 |

OTHER PUBLICATIONS

Second Written Opinion of international application No. PCT/US2012/067750, mailed Dec. 9, 2013, 8 pp.

International Search Report and Written Opinion—PCT/US2012/067750—ISA/EPO—Feb. 6, 2013, 12 pp.

\* cited by examiner

IMAGE PERCEPTUAL ATTRIBUTE ADJUSTMENT

This application claims the benefit of U.S. Provisional Application No. 61/583,416, filed Jan. 5, 2012, the entire contents of which are incorporated herein by reference in its entirety.

TECHNICAL FIELD

This disclosure relates to perceptual attribute adjustment, and more particularly, to perceptual attribute adjustment in a display processor.

BACKGROUND

One or more processing units associated with a computing device may generate and store one or more images in system memory. A display processor may retrieve an image from system memory, and perform one or more post-processing operations on the image prior to displaying the image on a display device, which may be integrated with, couple to, and/or in communication with the computing device. Part of the post-processing performed by the display processor may be perceptual attribute adjustment, such as adjustment of the hue, saturation, brightness, and/or contrast of the image.

SUMMARY

In general, the techniques described in this disclosure allow for display processors to adjust one or more perceptual attributes for different colors of an image by different amounts, without the need for any modification to existing hardware design of such display processors. For example, the techniques described in this disclosure may leverage the functionality of the color correction unit in a display processor to adjust the perceptual attributes of an image as desired. For instance, the color correction unit may utilize equations (e.g., in matrix form) to correct for deficiencies in the display device. In some examples, the techniques may modify the input used to determine the color correction matrix.

In this way, the equations used by the color correction unit to correct for deficiencies in the display may have built-in factors that can be used to also adjust perceptual attributes of different colors by different, desired amounts. For example, the color correction unit may compensate for the color rendering deficiencies of a display and adjust perceptual attributes of different colors by different amounts.

These built-in factors that can be used to adjust perceptual attributes may allow for different amounts of perceptual attribute adjustment for different colors without needing to modify the hardware of the display processor for such purpose. Accordingly, the techniques described in this disclosure may be implemented on display processors having existing hardware configurations. For example, the techniques described in this disclosure may leverage the existing hardware design of the color correction unit in a display processor for purposes of perceptual attribute adjustment.

In one example, the disclosure describes a method that includes receiving, with a display processor, input color values for pixels of an image. In this example, the input color values represent different colors within the image. The method also includes applying, with a color correction unit of the display processor, a color correction matrix to the input color values to compensate for deficiencies in an ability of a display to render colors represented by the input color values and to adjust perceptual attributes of the different colors by different amounts. In this example, the color correction matrix is generated from reference colors where perceptual attributes of different colors of the reference colors are modified by different amounts for different amounts of adjustment in perceptual attributes of the different colors within the image. The method further includes generating, with the display processor, an output image based on the application of the color correction matrix to the input color values, and displaying the output image.

In another example, the disclosure describes an apparatus that includes a display and a display processor configured to receive input color values for pixels of image, where the input color values represent different colors within the image. In this example, the display processor includes a picture adjustment unit configured to apply a global perceptual attribute gain or offset factor that adjusts perceptual attributes of the different colors within the input image by a same amount, and a color correction unit configured to apply a color correction matrix to the input color values to compensate for deficiencies in an ability of the display to render colors represented by the input color values and to adjust the perceptual attributes of the different colors by different amounts. In this example, the color correction matrix is generated from reference colors where perceptual attributes of different colors of the reference colors are modified by different amounts for different amounts of adjustment in perceptual attributes of the different colors within the image.

In another example, the disclosure describes an apparatus that includes a display, and a display processor. The display processor includes means for receiving input color values for pixels of an image, wherein the input color values represent different colors within the image, and means for applying a color correction matrix to the input color values to compensate for deficiencies in an ability of the display to render colors represented by the input color values and to adjust perceptual attributes of the different colors by different amounts. In this example, the color correction matrix is generated from reference colors where perceptual attributes of different colors of the reference colors are modified by different amounts for different amounts of adjustment in perceptual attributes of the different colors within the image. The display processor also includes means for generating, with the display processor, an output image based on the application of the color correction matrix to the input, and means for displaying the output image on the display.

In another example, the disclosure describes a computer-readable storage medium. The computer-readable storage medium having stored thereon instructions that when executed cause a display processor to receive input color values for pixels of an image, wherein the input color values represent different colors within the image, and apply, with a color correction unit of the display processor, a color correction matrix to the input color values to compensate for deficiencies in an ability of a display to render colors represented by the input color values and to adjust perceptual attributes of the different colors by different amounts. In this example, the color correction matrix is generated from reference colors where perceptual attributes of different colors of the reference colors are modified by different amounts for different amounts of adjustment in perceptual attributes of the different colors within the image. The instructions further cause the display processor to generate an output image based on the application of the color correction matrix to the input color values, and display the output image.

In another example, the disclosure describes a method that includes receiving input to modify at least one perceptual attribute of one of a plurality of reference colors by a first amount, and at least one perceptual attribute of another of the reference colors by a second, different amount to generate a modified set of reference colors, causing a display to render the modified set of reference colors, determining a difference between color values of the rendered modified set of reference colors and color values of the modified set of reference colors, determining a color correction matrix based on the determination, and storing the color correction matrix in a display device.

In another example, the disclosure describes an apparatus that includes a processor configured to receive input to modify at least one perceptual attribute of one of a plurality of reference colors by a first amount, and at least one perceptual attribute of another of the reference colors by a second, different amount to generate a modified set of reference colors, cause a display to render the modified set of reference colors, determine a difference between color values of the rendered modified set of reference colors and color values of the modified set of reference colors, determine a color correction matrix based on the determination, and store the color correction matrix in a display device.

In another example, the disclosure describes an apparatus that includes means for receiving input to modify at least one perceptual attribute of one of a plurality of reference colors by a first amount, and at least one perceptual attribute of another of the reference colors by a second, different amount to generate a modified set of reference colors, means for causing a display to render the modified set of reference colors, means for determining a difference between color values of the rendered modified set of reference colors and color values of the modified set of reference colors, means for determining a color correction matrix based on the determination, and means for storing the color correction matrix in a display device.

In another example, the disclosure describes a computer-readable storage medium. The computer-readable storage medium having stored thereon instructions that when executed cause one or more processors to receive input to modify at least one perceptual attribute of one of a plurality of reference colors by a first amount, and at least one perceptual attribute of another of the reference colors by a second, different amount to generate a modified set of reference colors, cause a display to render the modified set of reference colors, determine a difference between color values of the rendered modified set of reference colors and color values of the modified set of reference colors, determine a color correction matrix based on the determination, and store the color correction matrix in a display device The details of one or more examples are set forth in the accompanying drawings and the description below. Other features, objects, and advantages will be apparent from the description and drawings, and from the claims.

DETAILED DESCRIPTION

Figure 1:
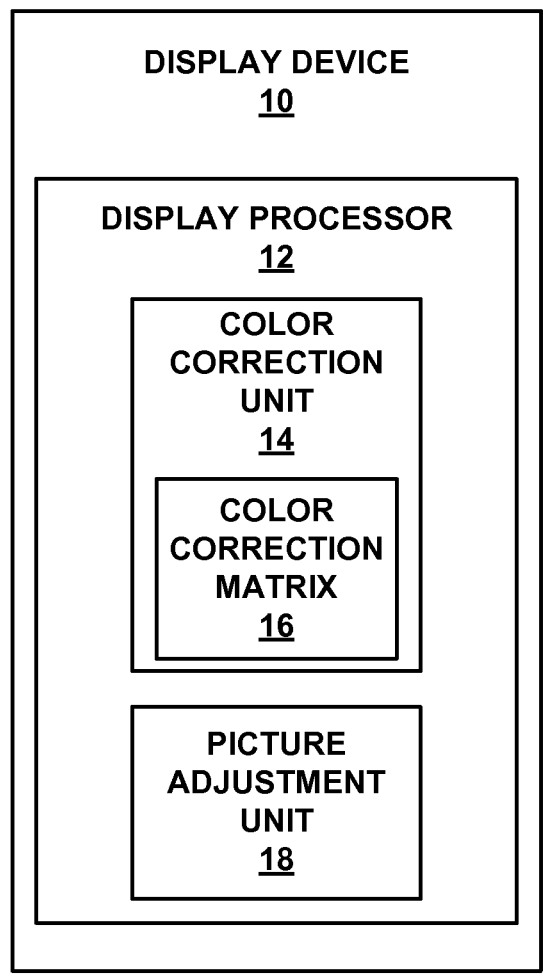
FIG. 1 is a block diagram illustrating a display device that is configured to implement one or more example techniques described in this disclosure.

In general, this disclosure is related to adjusting perceptual attributes of images. For purposes of description, the techniques are described with respect to saturation as the perceptual attribute. Saturation may be considered as a measure of how pure the colors in the picture are (e.g., the vividness of the picture). A highly saturated color may refer to a particular color that is highly intense. However, the techniques described in this disclosure are applicable to adjustment of other perceptual attributes as well, such as hue or intensity, as two examples.

Image perceptual attributes refer to basic image features that influence the manner in which a user perceives the attributes of the image. For example, image brightness and contrast are additional examples of perceptual attributes which provide measures of how a user perceives the image.

In some examples, a display processor may be tasked with adjusting perceptual attributes of an image. For example, a processing unit, such as a graphics processing unit (GPU) or a video decoder, as two examples, may store a fully generated image in the system memory of a computing device. The display processor may retrieve the stored image from the system memory and adjust perceptual attributes of the image. The display processor may be external to the processing unit that generated the image, or may be part of the same of the integrated circuit (IC) that includes the processing. The computing device may house both the processing unit and the display processor.

A display processor may include a picture adjustment unit and a color correction unit. The picture adjustment unit may be configured to adjust the image (i.e., picture) retrieved from system memory in response to user input. The color correction unit may be configured to adjust the image to correct for display imperfections.

In general, the picture adjustment unit may adjust perceptual attributes such as saturation levels. For example, a user may select a desired saturation level, and in response, the picture adjustment unit may adjust the saturation of the picture to the desired level. However, in some examples, the picture adjustment unit may adjust the saturation level globally. For instance, the picture adjustment may increase or decrease the saturation level, as selected by a user, for all colors by a same amount. This may result in over saturation of some colors and under saturation of other colors, causing undesirable distortions in the resulting picture.

As described in more detail, the techniques described in this disclosure may allow for variable adjustment of the perceptual attributes (i.e., different amounts of adjustment for different colors). Such variable adjustment of perceptual attributes may allow the display processor to not over or under saturate the colors, as one example.

The techniques may leverage an existing hardware design of the color correction unit for such adjustment because, in some examples, the existing hardware design of the picture adjustment unit may not be configured to adjust saturation differently for each color. Rather, the picture adjustment unit may only adjust perceptual attributes globally, and not on a per color basis. It may be possible to redesign the picture adjustment unit for variable perceptual attribute adjustment.

However, it may be desirable to provide variable perceptual attribute adjustment with current display processor hardware designs, rather than requiring end users to wait for deployment of a new display processor.

In general, the color correction unit may be preprogrammed to apply a matrix multiplication to the pixel values of the input image to correct for color rendering deficiencies or other color response variations of the display. For example, during an off-line stage (e.g., at the factory), a computing device such as a personal computer (PC) or computer workstation may perform a calibration. The PC may cause a target display or cause the device that includes the display processor to display a set of initial reference colors such as the 24 reference colors presented in the Macbeth® ColorChecker® reference color chart or some other similar reference color chart. These initial reference colors may be defined by input color values. The color reference chart may include a set of different color patches. A colorimeter (as one example) may measure the output color values, e.g., of the output color patches, as displayed. In some examples, it may be possible that PC may drive the display with input values in one color space and measure the output in another color space, as described in more detail.

Due to the color rendering deficiencies of the display, the measured output color values and the input color values (e.g., the color values of the reference colors) may be different. That is, different displays may present different color output for a given set of input color values (e.g., due to process, materials or other variations among the displays). The PC may determine a color correction matrix (e.g., a 3×3, 3×4, or 3×11 matrix) such that when the input color values are multiplied by the color correction matrix, and the resulting output color values are displayed on the display, the measured output color values are substantially similar to the initial input color values.

For example, the reference color values may be defined in a particular color space. One example of a color space is the RGB color space where the color of a pixel of the image is defined as a combination of red, green, and blue colors. Another example of the color space is a HSI, where H stands for hue, S stands for saturation, and I stands for intensity (brightness).

The color correction matrix may be a matrix of values that the color correction unit applies to the input color values of the image to compensate for the color rendering deficiencies of the display so that the displayed colors are substantially similar to the colors of the image, such as the colors of the patches in a color reference chart. The PC may load the color correction matrix in the color correction unit (e.g., by loading a table or other data structure that includes matrix coefficients into memory or registers of the display processor). Then, during operation (e.g., on-line stage), the color correction unit may adjust the input color values of incoming images based on the determined color correction matrix before the images are displayed on the display.

In accordance with the techniques described in this disclosure, the color correction unit may perform display color correction (e.g., compensate for the color rendering deficiencies or color response variation of the display) and also perform perceptual attribute adjustment. For example, the PC (used to determine the color correction matrix) may provide a perceptual attributes adjustment software tool. A user may utilize the software tool to adjust perceptual attributes (e.g., saturation) of the reference colors (e.g., the 24 Macbeth colors or any other reference colors).

The result of the adjustment may be referred to as modified reference colors. In particular, the tool may be used to adjust input color values associated with the color patches of the color reference chart. In some examples, the user may modify the reference colors such that when these modified reference colors are used to determine the color correction matrix, the color correction matrix may have built-in factors that adjust the perceptual attributes of different colors by different amounts. As one example, using the modified reference colors to determine the color correction matrix may allow the user to increase the saturation level of some colors more than other colors, or decrease the saturation level of some colors more than other colors (i.e., provide variable adjustment of perceptual attributes for different colors).

After the user uses the software tool to adjust the reference colors to create the modified reference colors, as part of the calibration, the PC may utilize the modified reference colors as input color values, and display the input color values on the display. A colorimeter may measure the output color values of the displayed colors. The PC may determine the color correction matrix based on the color values of the modified reference colors and the measured color values of the displayed output colors, in a manner similar to the above description.

The PC may upload the color correction matrix to the color correction unit. Then, during operation of the computing device in the field (e.g., on-line stage), the color correction unit may correct the input color values of incoming images based on the determined color correction matrix before the images are displayed on the display.

In some examples, the software tool may be a graphical user interface (GUI) based picture adjustment tool. With the GUI-based picture adjustment tool, as described above, the user may increase the saturation levels for a set of reference colors, and potentially increase the saturation by different amounts for different reference colors.

In some examples, the PC may determine a color correction matrix for each of different display modes. For example, for a natural mode, the user may determine one set of modified reference colors and the PC may determine a color correction matrix for the natural mode, and for a standard mode, the user may determine another set of modified reference colors and the PC may determine another color correction matrix for the standard mode. The color correction unit may then apply the appropriate color correction matrix to the color values of an image based on the selected mode.

Accordingly, in the techniques described in this disclosure, a user may modify the color values of reference colors to generate color values for modified reference colors. The user may modify the color values of the reference color to adjust perceptual color attributes. The PC may then determine a color correction matrix based on the color values of the modified reference colors, and upload the color correction matrix into the display processor or the computing device that includes the display processor. Then, when the color correction unit applies the color correction matrix to input color values of a picture, the application of the color correction matrix addresses deficiencies of the display in rendering color and adjusts perceptual attributes of different colors by different amounts.

In other words, in accordance with the techniques described in this disclosure, the color correction unit, in addition to performing color correction to address color rendering deficiencies of the display, may also perform variable perceptual attribute adjustment. In this manner, the techniques described in this disclosure may allow for existing display processors to provide variable saturation (i.e., different saturation levels for different colors and for different modes). For instance, no modification to the picture adjustment unit or the color correction unit may be necessary. Instead, the color correction matrix, as generated in accordance with the techniques described in this disclosure, can be uploaded into current display processors. Then, when the color correction unit applies the color correction matrix, the result may be both compensation for color rendering deficiencies and variable perceptual attribute adjustment (i.e., different attribute adjustment for different colors and for different modes).

FIG. 1 is a block diagram illustrating a display device that is configured to implement one or more example techniques described in this disclosure. For example, FIG. 1 illustrates display device 10. Examples of display device 10 include, but are not limited to, wireless handsets such as so-called "smart" phones, so-called "smart" pads, or other such wireless devices equipped for wireless communication. Additional examples of display device 10 include, but are not limited to, a digital television, a device in digital direct broadcast system, a device in a wireless broadcast system, a personal digital assistant (PDA), a laptop computer, a desktop computer, a tablet computer, an e-book reader, a digital camera, a video gaming device, a video game console, a cellular radio telephone, a satellite radio telephone, a video teleconferencing device, a video streaming device, or the like. In general, display device 10 may be any device that displays image content (e.g., video, pictures, and/or graphics content).

Figure 4:
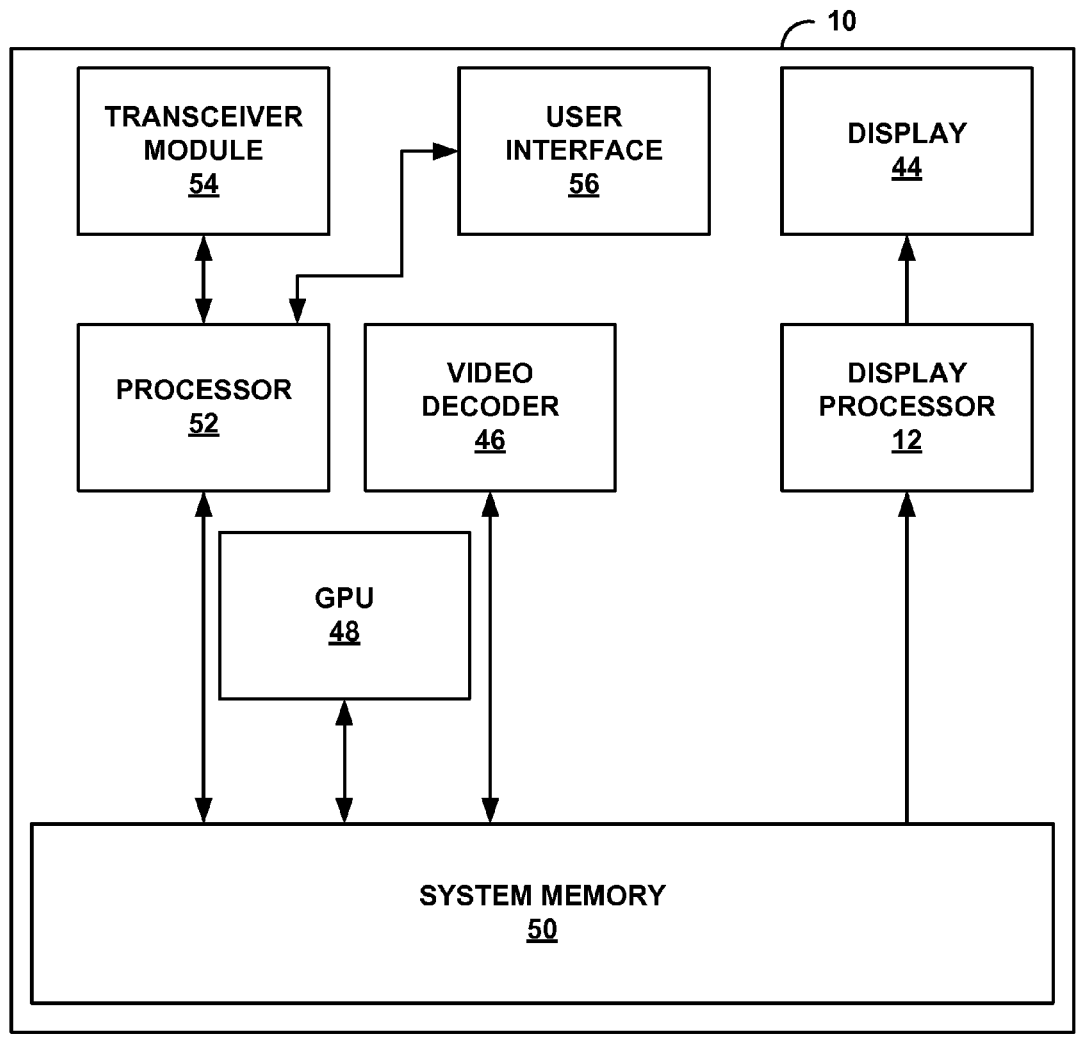
FIG. 4 is a block diagram illustrating an example of a device that may be configured to implement one or more techniques described in this disclosure.

As illustrated, display device 10 includes display processor 12. Display device 10 includes additional components, as illustrated in FIG. 4. However, for ease of description, only display processor 12 of display device 10 is illustrated in FIG. 1.

Display processor 12 may be implemented as any of a variety of suitable circuitry, such as one or more microprocessors, a digital signal processor (DSP), an application specific integrated circuit (ASIC), field programmable gate array (FPGA), discrete logic, and the like. In some examples, display processor 12 may be integrated with other processing circuitry of display device 10, or may be a stand-alone processor, as illustrated in FIG. 1.

Display processor 12 may be configured to perform some post-processing functions on image content. For example, a video decoder may generate video pictures that are to be displayed, and store the video pictures in a system memory of display device 10. A camera processor may store a captured image in the system memory. A graphics processing unit (GPU) may generate graphics images, and store the graphics images in the system memory. Display processor 12 may retrieve such images, regardless of where the images were generated from, perform one or more post-processing functions on the images, and cause a display of display device 10 to display the images, as processed by display processor 12.

The term "post-processing" is used in this disclosure to mean that display processor 12 performs processing functions on composed images. For example, display processor 12 may not perform any functions on the images that are being generated by the video decoder, the camera processor, or the GPU while the images are being generated. Once these processing units generate and store respective composed images (e.g., as an array of pixels), then display processor 12 may retrieve the images from system memory and perform its processing functions.

There may be at least two post-processing functions that display processor 12 may perform. The first may be picture adjustment, and the second may be color correction. For example, as illustrated, display processor 12 includes picture adjustment unit 18 and color correction unit 14. Picture adjustment unit 18 and color correction unit 14 may be implemented as hardware units, software units executing on hardware, or a combination thereof. For purposes of illustration, picture adjustment unit 18 and color correction unit 14 are described as being hardware units.

Moreover, although picture adjustment unit 18 and color correction unit 14 are illustrated as separate units, aspects of this disclosure are not so limited. In other examples, picture adjustment unit 18 and color correction unit 14 may be integrated with one another. For ease of description, the functionality of picture adjustment unit 18 and color correction unit 14 is described separately. However, it should be understood that such functionality of picture adjustment unit 18 and color correction unit 14 may be implemented together or separately.

Picture adjustment unit 18 may be configured to globally adjust image perceptual attributes of each of the colors in the images retrieved from the system memory. Perceptual attributes refer to a measure of perceivable attributes of the colors within the image. For instance, examples of perceptual attributes include hue, saturation, brightness, and contrast of the colors within the image. Picture adjustment unit 18 may adjust one or more of these perceptual attributes in the luma chroma (YCbCr) color space based on a 3×4 matrix. Another example of the luma chroma color space is L*a*b* (perceptually uniform color space).

For example, the video decoder, camera processor, or GPU may store the image as pixel values with red, green, and blue values in the red-green-blue (RGB) color space. In the RGB color space, the color of each pixel is defined by a color value that includes a red component, a green component, and blue component. Display processor 12 may retrieve the images defined in the RGB color space. For example, display processor 12 may retrieve input color values for pixels of the image stored in system memory, where the input color values represent different colors within the image. Display processor 12 may convert the color values into a different color space, such as the YCbCr color space. Display processor 12 may utilize any known or yet to be developed method for converting the color values from the RGB color space to the YCbCr color space. Alternatively, it may be possible for display processor 12, including picture adjustment unit 18 and color correction unit 14, to perform respective functions in the RGB color space.

Although the above example describes display processor 12 converting the color values from the RGB color space to the YCbCr color space, aspects of this disclosure are not so limited. As another example, display processor 12 may convert the color values from the RGB color space to the hue, saturation, intensity (HSI) color space, hue, saturation, lightness (HSL) color space, or hue, saturation, value (HSV) color space.

In the HSI, HSL, and HSV color spaces, hue is a measure of the color content, and saturation is a measure of vividness, such as a measure of how pure the color is. Intensity, lightness, and value are each a measure of the brightness or darkness of the color. The difference in any of the hue, saturation, or intensity, lightness, or value between two colors may provide a measure of the contrast.

In some examples, display processor 12 may convert the color values from the RGB color space, to the YCbCr color space, and from the YCbCr color space to the HSI color space. Such conversion may require intermediate mapping between the color spaces. For example, the hue (H) equals the a tan (Cr/Cb), the saturation (S) equals the square-root of ($Cb^2$+$Cr^2$), and the intensity I equals Y. In the reverse, Cb equals S*cos(H), Cr equals S*sin(H), and Y equals I.

Picture adjustment unit 18 may receive the color values in the YCbCr color space and adjust the perceptual attributes (e.g., hue, saturation, brightness, and contrast) using a 3×4 matrix. For example, display processor 12 may store a predetermined 3×4 matrix for each of the perceptual attributes, and use respective 3×4 matrices to adjust respective perceptual attributes. In some examples, the specific values of the 3×4 matrix may be determined during run-time. In these examples, the stored 3×4 matrix may include variables that are defined during run-time.

In some examples, picture adjustment unit 18 may adjust hue and brightness by two offset parameters, and adjust saturation and contrast by two gain factors. The offset parameters and gain factors may be user-selectable. For example, a user may desire to increase the saturation or decrease the saturation, and may accordingly select the desired gain factor to either increase or decrease the saturation.

In accordance with techniques described in this disclosure, the gain factor or the offset parameter may be a global gain factor or a global offset parameter. For example, picture adjustment unit 18 may be configured to apply the gain factor for the saturation to each of the colors in the image. In other words, when picture adjustment unit 18 adjusts the saturation level, picture adjustment unit 18 adjusts the saturation level for each of the colors by the same amount. In this sense, picture adjustment unit 18 may be considered as allowing for selection of a single gain factor that is applied globally to all colors, regardless of whether it is desirable to apply the gain factor to a particular color.

For example, if only a single gain factor is available, when picture adjustment unit 18 adjusts the saturation, picture adjustment unit 18 may apply the same adjustment level, as controlled by the single gain factor, to all colors. Such global adjustment may be illustrated by the following equation.

$$\begin{bmatrix} Y' \\ Cb' \\ Cr' \end{bmatrix} = \begin{bmatrix} 1 & 0 & 0 \\ 0 & Ks & 0 \\ 0 & 0 & Ks \end{bmatrix} * \begin{bmatrix} Y \\ Cb \\ Cr \end{bmatrix}$$

In the above equation, Y, Cb, and Cr are the luma and chroma values for a pixel in the image, Ks is the saturation gain factor, and Y', Cb', and Cr' are the resulting luma and chroma values for the pixel in the image after picture adjustment unit 18 applies the above equation to the pixel in the image. In this example, if "S" represents the saturation of the original pixel defined by the Y, Cb, and Cr values, and "$S_{new}$" represents the saturation level for the pixel defined by the Y', Cb', and Cr' values, then $S_{new}$ equals Ks multiplied by S.

In the above equation, picture adjustment unit 18 may apply the gain factor Ks to each of the pixels regardless of the color of the pixels of the image. For example, picture adjustment unit 18 may apply the gain factor of Ks to a red pixel in the image, and apply the same gain factor of Ks to an orange pixel in the image. In this manner, picture adjustment unit 18 may adjust saturation by a global gain factor Ks. In this example, the hue (H) and the intensity (I) are fixed.

There may be certain issues with globally adjusting perceptual attributes, such as saturation, where adjusting globally refers to adjusting perceptual attributes by the same amount for each color. For example, some types of display device 10 use a smaller color gamut, as compared to other types of display device 10. A color gamut refers to the portion of the color space that can be represented or reproduced by display device 10. For example, the color gamut may indicate the range of colors that can be displayed. In general, it may not be possible or it may be unrealistic for a display to display all possible visible colors. The colors within a color space that a display can display are referred to as display color gamut. The colors that cannot be displayed are referred to as out of gamut.

The color gamut of a display may be based on the wideband color filters of the display. In addition to setting the color gamut, the wideband color filters may also have the effect of reducing the saturation levels of certain colors. Then, when these certain colors are displayed, the reduction in the saturation level, due to the wideband color filters, reduces the vividness of the color on the display, resulting in a reduction in quality of the image.

It may be possible for picture adjustment unit 18 to be configured to increase the saturation level to compensate for the reduction in saturation level due to the wideband color filters and the smaller color gamut. However, because picture adjustment unit 18 globally adjusts the saturation gain factor equally for all colors, such increase in the saturation level by picture adjustment unit 18 may result in over-saturating of some colors and under-saturating of other colors.

For example, different levels of saturation increase may be required for different colors (e.g., the skin tone vs. foliage), and the single saturation gain factor provided by picture adjustment unit 18 may limit the ability to apply different levels of saturation to different colors. In general, using a single perceptual attribute gain or offset for adjusting image perceptual attributes may lead to clipping on either image highlights or image shadows, which may ultimately lead to color artifacts. Such clipping is illustrated in FIG. 2 in more detail.

Figure 2:
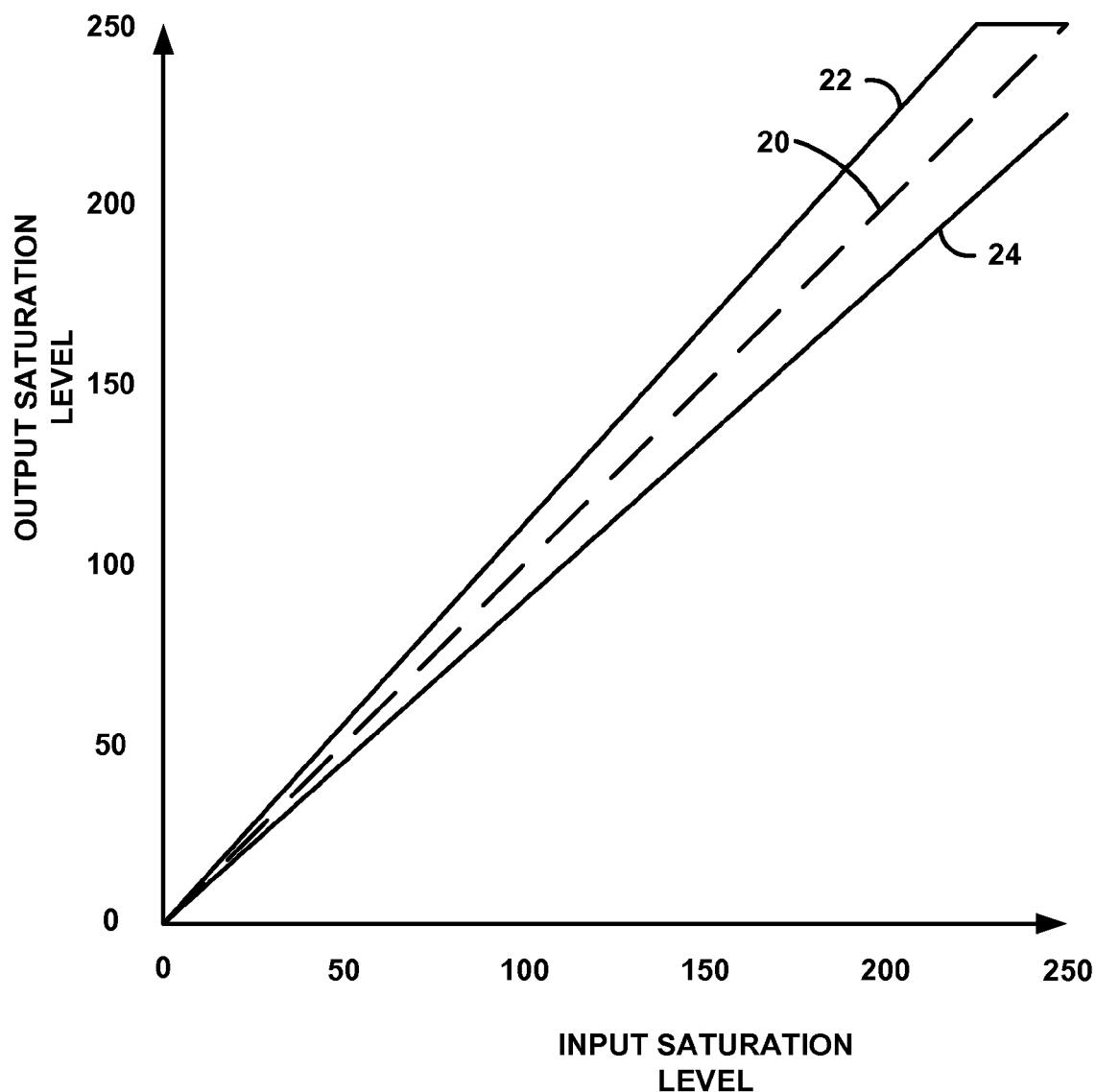
FIG. 2 is a graph illustrating oversaturation and undersaturation.

FIG. 2 is a graph illustrating oversaturation and undersaturation. In FIG. 2, the x-axis is input saturation level, and the y-axis is output saturation level. Line 20 in FIG. 2 is the example where the perceptual attribute gain factor (e.g., the gain factor for the saturation) is 1. Line 22 in FIG. 2 is the example where the perceptual attribute gain factor is 1.1, and line 24 in FIG. 2 is the example where the perceptual attribute gain factor is 0.9. In this example, if picture adjustment unit 18 applies the gain factor of 1.1, then for all colors with saturation level equal to approximately 227 and greater, there will be oversaturation (thus saturation clipping), as illustrated by the flat line portion of line 22.

For example, assume that the input saturation level of a first color is 240, and the input saturation level for a second color is also 240. Also, assume that the wideband filters cause the saturation level of the first color to reduce to 226. In this example, if picture adjustment unit 18 applies a global perceptual attribute gain factor (i.e., a global saturation gain factor in this example) of 1.1, then the output saturation level of the first color may be approximately 249, and there is not oversaturation. In this example, since the 1.1 saturation gain factor is global, the second color would also be gained by 1.1, which is 264, and greater than the maximum allowable saturation level of 250 (i.e., there is oversaturation). In this case, the output saturation level of the second color may be clipped to 250.

Alternatively, if picture adjustment unit 18 set the perceptual attribute gain factor of 0.9 (e.g., line 24), then there may be under-saturation. For example, it may be desirable for certain colors to be at an output saturation level of 250, but with a gain factor of 0.9, it may not be possible for certain colors to reach the 250 output saturation level.

This disclosure may provide for variability in the amount of perceptual attribute gain or offset factor that is applied to different colors. In particular, the techniques described in this disclosure may leverage the current functionality of color correction unit 14 for purposes of variable perceptual attribute adjustment as picture adjustment unit 18 may only provide global perceptual attribute adjustment. For purposes of illustration, the techniques are described in context of variability in the amount of saturation gain factor. However, the techniques may be applied to other types of perceptual attribute gain or offset factors such as those of hue, intensity, and contrast.

Referring back to FIG. 1, in accordance with techniques described in this disclosure, color correction unit 14 of display processor 12 may be configured to provide variable perceptual attribute gain factors. In this manner, color correction unit 14 may perform tasks related to addressing deficiencies in the ability of the display of display device 10 to render color. In addition, the example techniques may configure color correction unit 14 to provide variable perceptual attribute gain without needing any hardware changes to display processor 12. In this way, the techniques described in this disclosure may provide for a mechanism by which to adjust saturation levels of different colors by different amounts for current, existing designs of display processor 12.

For instance, it may be possible to modify the hardware of display processor 12 such that picture adjustment unit 18 can provide different amounts of saturation levels for different colors. However, many existing examples of display processor 12 may not be configured to provide different amounts of saturation levels for different colors, and therefore, to allow picture adjustment unit 18 to provide variable saturation level gain would require customers of display processor 12 to wait until such an updated display processor with a modified hardware design is available.

The techniques described in this disclosure may not require any changes to picture adjustment unit 18, and may instead leverage the current functionality of color correction unit 14 for purposes of providing variable amount of saturation level gain (e.g., different amount of saturation gain for different colors). As described in more detail, the techniques described in this disclosure may be considered as a form of gamut mapping with chroma expansion intent based on existing color correction unit 14. For example, as described above, the chroma (e.g., CbCr) may be related to the saturation level (i.e., S=sqrt($Cb^2+Cr^2$)), and therefore, the chroma expansion refers to the different amount of saturations that can be applied to different colors.

In this manner, the techniques described in this disclosure may allow for a current, existing display processor 12 to provide for variable amount of saturation gain. Accordingly, a manufacturer of display device 10 may be able to achieve variable amount of saturation gain on current, existing examples of display device 10, thereby increasing the viewing quality of the images rendered by display device 10.

In general, color correction unit 14 may be configured to compensate for deficiencies of color rendering by the display of display device 10. For example, due to manufacturing variation or component variation, a display may not display certain colors perfectly. As illustrated in FIG. 1, color correction unit 14 includes color correction matrix 16. Color correction matrix 16 may be a preloaded matrix that defines the correction that is to be applied to various colors to correct for the deficiencies of the capabilities of the display to render colors.

For example, color correction matrix 16 may be a 3×3, 3×4, or a polynomial 3×11 color correction matrix. The polynomial 3×11 color correction matrix may be applied in the linear space. Color correction matrix 16 may define the manner in which the colors within an image should be adjusted to compensate for the deficiencies in the ability of the display to render the colors.

In some examples, color correction unit 14 may receive the image from picture adjustment unit 18. For each pixel of the image, color correction unit 14 may multiply color correction matrix 16 with the color values of the pixel, and display processor 12 may cause the display to render the resulting color values for that pixel.

Color correction matrix 16 is illustrated as being within color correction unit 14 for ease of illustration. In other examples, a cache or local memory of display processor 12 may store color correction matrix 16. In yet other examples, the system memory of display device 10 may store color correction matrix 16. However, because it may be advantageous for color correction unit 14 to quickly retrieve color correction matrix 16, color correction matrix 16 may be stored in a cache or local memory of display processor 12.

Figure 3:
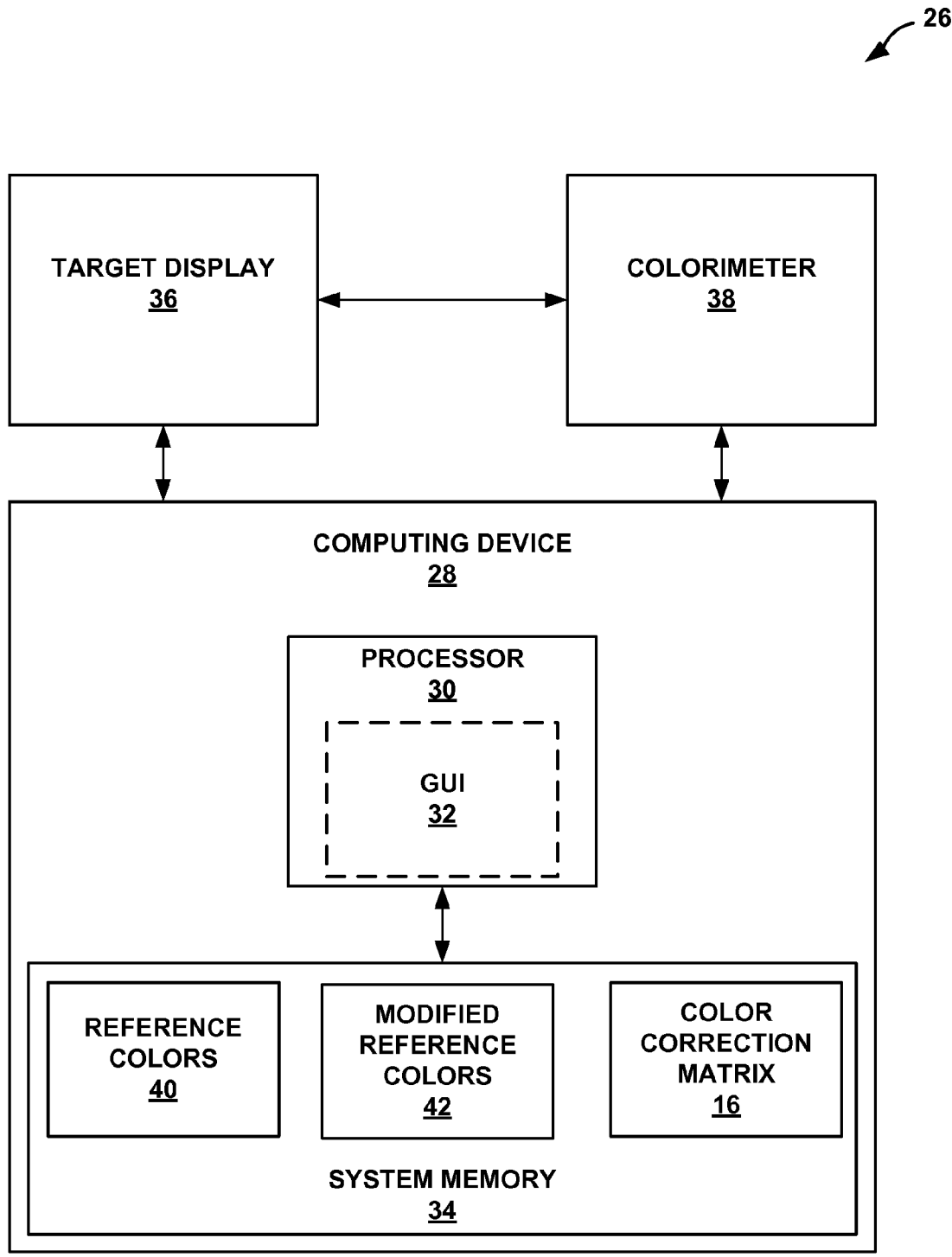
FIG. 3 is a block diagram illustrating a system for determining a color correction matrix.

The manner in which color correction matrix 16 is generated is described in more detail with respect to FIG. 3. FIG. 3 is a block diagram illustrating a system for determining a color correction matrix. For example, FIG. 3 illustrates system 26 that may be implemented prior to the operation of display device 10. For instance, system 26 may be implemented at the manufacturer side before a user uses display device 10.

Accordingly, system 26 implements its functions in an off-line stage (e.g., at the factory or manufacturer). As described in more detail, system 26 may provide for color correction calibration. For example, system 26 may determine color correction matrix 16 such that when display device 10 is in an on-line stage (e.g., during run-time or when being used by the user), display processor 12 via color correction unit 14 may adjust perceptual attribute values, such as saturation levels, of different colors by different amounts.

System 26 includes computing device 28, target display 36, and colorimeter 38. Examples of computing device 28 include, but are not limited to, a laptop computer, a desktop computer, a tablet computer, a specialized computing device, or the like. Computing device 28 may include processor 30 and system memory 34. Processor 30 may be the central processing unit (CPU) of computing device 28. System memory 34 may be memory of computing device 28. For example, system memory 34 may be random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

As illustrated, system memory 34 may store reference colors 40. Reference colors 40 may be a set of colors with specific color values that can be used to calibrate various types of displays such as target display 36. One example of reference colors 40 is the Macbeth ColorChecker Chart with 24 colors. However, the techniques described in this disclosure may utilize different reference colors than the 24 reference Macbeth colors.

Reference colors 40 may define a set of input color values. As described in more detail, computing device 28 may cause target display 36 to display reference colors 40 (e.g., display color based on the input color values defined by reference colors 40). Colorimeter 38 may determine measure the output color values (e.g., the color values of the colors displayed by target display 36). Computing device 28 may then generate a color correction matrix such as color correction matrix 16 based on a comparison between the output color values and the input color values.

However, aspects of this disclosure are not so limited. For instance, reference colors 40 may be considered as a test image or pattern that computing device 28 uses to determine the color rendering deficiencies of target display 36. In some examples, rather than storing reference colors 40 and causing target display 36 to output these colors, the techniques described in this disclosure may exploit the display processor pipe of display processor 12 to determine color correction matrix 16. The techniques that utilize the display processor pipe of display processor 12 are described in more detail below.

In accordance with techniques described in this disclosure, computing device 28 may display (i.e., render) reference colors 40 on target display 36. The display of computing device 28 may be different than target display 36. For example, the display of computing device 28 may be the display that the user uses to interact with computing device 28. Target display 36 may be a display with which the user determines deficiencies or variations in the ability of target display 36 to display colors.

For example, target display 36 may be substantially similar to the display of display device 10 (FIG. 1). For instance, target display 36 and the display of display device 10 may be taken from the same manufacturing lot. In some examples, displays from the same manufacturing lot may suffer the same types of deficiencies or variations (e.g., the displays may be deficient, in the same way, for the same colors).

Alternatively, it may be possible for target display 36 to be the display of display device 10. For example, after testing, display device 10 may be attached with target display 36. However, testing each display of each display device 10 may be cumbersome, and it may be sufficient to only test one display within a lot with assurance that all displays within the lot function in a substantially similar manner.

In some examples, rather than testing each display of each display device 10, it may be possible to test one display device 10. In this example, the displays of other display devices 10 that are from the same lot as the display device 10 under testing may suffer the same types of deficiencies or variations as the display of the display device 10 under test. In this manner, not all display devices 10 need to be tested, and the techniques described in this disclosure may be able to exploit the display processor pipe of display processor 12 of the display device 10 under test for purposes of determining the manner in which color correction is to be applied, as described in more detail below.

In general, the number of displays that need to be tested may be a function of the quality of the manufacturing of the displays. For example, displays that are manufactured with high quality may not experience much display-to-display or lot-to-lot variation. Conversely, displays manufactured with lower quality may experience substantial display-to-display or lot-to-lot variation. Accordingly, fewer target displays may need to be tested for displays manufactured with high quality as compared to displays manufactured with low quality.

In techniques described in this disclosure, after computing device 28 renders reference colors 40 on target display 36, colorimeter 38 may measure the color values of the reference colors on target display 36. In other words, reference colors 40 may form the input color values, and colorimeter 38 may measure the output color values Colorimeter 38 may then output the measured color values to processor 30. Colorimeter 38 is illustrated as one example way in which to determine the color values of reference colors rendered on target display 36. Other techniques to determine the color values may be possible.

Due to display deficiencies or variations of target display 36 in displaying color, the measured output color values and the input color values of reference colors 40 may be different. Processor 30 may determine the difference in the measured output color values and the input color values of reference colors 40. Based on the difference, processor 30 may determine a color correction matrix such that when the color value of a pixel of an image is multiplied by the color correction matrix, the rendered color on target display 36 is substantially the same as its color in reference colors 40 (i.e., the output color value of the rendered color on target display 36 is substantially the same as the input color value of the corresponding color patch in reference colors 40).

In accordance with the techniques described in this disclosure, processor 30 may not determine color correction matrix 16 based on reference colors 40. Rather, processor 30 may determine color correction matrix 16 based on modified reference colors 42, as described in more detail below. For example, processor 30 causes computing device 28 to display modified reference colors 42 on target display 36. Colorimeter 38 may measure the output color values when the modified reference colors are used as the input color values and displayed on target display 36. Colorimeter 38 may transmit the measured color values to processor 30.

Processor 30 may then determine the difference between the measured output color values where the modified reference colors 42 are used as the input color values and the actual input color values of modified reference colors 42. Based on the difference, processor 30 may generate color correction matrix 16 based on the color values in modified reference colors 42. Computing device 28 may then upload color correction matrix 16 in display device 10, as described in more detail below.

In some examples, computing device 28 may not need to store modified reference colors 42. For instance, rather than outputting the colors on target display 36, the techniques described in this disclosure may allow for display device 10 to render output colors as part of the calibration. For example, display processor 12 may include a convert block that is prior to color correction unit 14 in the display processor pipeline.

Processor 30 of computing device 28 may utilize the convert block of display processor 12 to generate the input colors on the fly. These input colors may be considered as test patterns or test images. For example, rather than using target display 36, computing device 28 may couple to display device 10. Processor 30 may then set/write three register values in the convert block. These three register values may correspond to the RGB values of the flat test pattern/image. For example, processor 30 may write the RGB values of modified reference colors 42 in the registers of the convert block (e.g., by setting the registers to the appropriate values). Display processor 12 may then output the color values on the display of display device 10.

In this manner, in some examples, computing device 28 may not need to store reference colors 42. Instead, processor 30 may write/set input color values, similar to those of reference colors 42, in display processor 12. Display processor 12 may then output the color values on the display of display device 10, and colorimeter 38 may measure the output color values from the display of display device 10, and determine the difference between the measured output color values and the input color values. In this manner, the techniques may allow for dynamic creation of the required test pattern or image (e.g., color values substantially similar to the color values of reference colors 40).

In this example, processor 30 may then determine the values of color correction matrix 16, and load color correction matrix 16 into display device 10. As described in more detail, color correction unit 14 may multiply the color values of the pixels of the input image with color correction matrix 16 to correct for the color rendering deficiencies of the display of display device 10.

To generate modified reference color values 42, or to determine the register values of the convert block of display processor 12 such that the input color values are similar to those of reference color values 42, a user may utilize a software tool. For instance, as illustrated, processor 30 may generate graphical user interface (GUI) 32. For example, processor 30 may execute a software tool, and the execution of the software tool may cause processor 30 to display GUI 32 on a display of computing device 28. GUI 32 is illustrated in dashed lines within processor 30 to ease with understanding. However, GUI 32 does not actually reside within processor 30. Rather, GUI 32 is the result of processor 30 executing instructions associated with a software tool. The software tool that processor 30 executes may be considered as a GUI-based picture adjustment tool.

The software tool may allow a user to modify perceptual attributes of reference colors 40. For example, the software tool, upon execution, may cause the display of computing device 28 to present GUI 32. GUI 32 may list the colors of reference colors 40 and their respective color values. GUI 32 may also allow a user to modify perceptual attribute values of each of the colors. In particular, GUI 32 may allow the user to modify perceptual attribute values of different colors by different amounts. For example, the user may use the GUI-based picture adjustment tool to adjust the four example perceptual attributes (Hue, Saturation, Brightness, and Contrast) as desired, with different colors being adjusted differently.

In some examples, for proper adjustments of color perceptual attribute, a calibrated monitor may be used. This may be beneficial for rendering reference colors and adjusted colors accurately and reliably.

As described above, the wideband color filters or smaller color gamut may cause the saturation of certain colors to reduce. GUI 32 may allow the user to increase the saturation of different colors by different amounts to compensate for the reduction in saturation that will be caused by the wideband color filters or the smaller color gamut. Again, it should be noted that saturation is one example of perceptual attributes, and that GUI 32 may allow the user to modify other perceptual attributes such as hue, brightness, and contrast, as a few examples.

In some examples, the wideband color filters or the smaller color gamut may not reduce the saturation of skin tone colors by much. However, the wideband color filters or the smaller color gamut may drastically reduce the saturation of foliage colors, such as green. With GUI 32, the user may be able to increase the saturation of skin tone colors by a low level, and increase the saturation of foliage colors by a high level to compensate for the reduction in the saturation caused by the wideband color filters or the smaller color gamut.

In some examples, the color gamut of the display may be relatively large or standard. In these examples, the user may use GUI 32 to adjust the perceptual attributes of different colors to exploit the large or standard color gamut. In this manner, the techniques described in this disclosure may be applicable for small color gamut displays and large color gamut displays by providing a general mechanism for adjusting perceptual attributes of different colors by different amounts.

As one example, assume that the reference colors are the Macbeth® ColorChecker® chart with 24 colors represented in different color patches. In this example, there may be a saturation value associated with each color of the Macbeth ColorChecker chart with 24 colors. GUI interface 32 may allow a user to modify the saturation values of each of the reference colors. In some examples, GUI interface 32 may allow a user to modify the saturation values by different amounts for different colors. For example, GUI interface 32 may allow the user to modify a saturation value of first color of the 24 Macbeth reference colors by a first amount, and modify a saturation value of a second, different color of the 24 Macbeth reference colors by a second, different amount.

In some examples, GUI interface 32 may allow modification of the perceptual attribute values in the L*a*b color space. The L*a*b color space is based on an approximation of human vision. By allowing modification in the L*a*b color space, the user may be able to modify the perceptual attribute values, such as saturation values, for different colors by different amounts based on human perception of colors. The L*a*b color space is provided for illustration purposes only, and should not be considered limiting. In other examples, GUI interface 32 may allow modification in any other color space.

In some examples, after modification, processor 30 may store the input color values for these reference colors with modified perceptual attribute values as modified reference colors 42. However, this is not required in every example. For instance, rather than storing the input color values as modified reference colors 42, processor 30 may write/set the three registers of the convert block of display processor 12 with the RGB values that are substantially similar to the input color values of the modified reference colors. In this manner, the input color values of the modified reference colors may be created dynamically (e.g., on-the-fly), rather than needing to be stored in computing device 28. In some other examples, it may be possible that the input color values for the modified reference colors are generated on-the-fly, and also stored in computing device 28.

As described above, processor 30 may then cause target display 36 to render modified reference colors 42, or display processor 12 may display the input color values written or set in the registers of the convert block on the display of display device 10. Colorimeter 38 may measure the output color values of the rendered modified reference colors, and output the measured output color values to processor 30. Processor 30 may determine the difference between the measured output color values of the rendered modified reference colors and the actual input color values of the modified reference colors (e.g., either the input color values of modified reference colors 42 or the input color values written to or set by the registers of convert block of display processor 12).

Based on the difference, processor 30 may determine color correction matrix 16. For example, color correction matrix 16 may be a 3×3, a 3×4, or a polynomial 3×11 color correction matrix. Computing device 28 may then upload the determined color correction matrix 16 into display processor 12 of display device 10. For example, for each one of a plurality of display devices 10 whose display is substantially similar to target display 36, the manufacturer may upload the processor 30 determined color correction matrix 16 into display device 10. In examples where the modified reference colors are written to or set in the registers, display device 10 may already be coupled to computing device 28, and processor 30 may upload color correction matrix 16 into display device 10.

In this manner, when display device 10 is in on-line (e.g., while being operated), display processor 12 may retrieve an image from the system memory of display device 10. For example, display processor 12 may receive input color values for pixels of an input, where the input color values represent different colors within the image. Picture adjustment unit 18 may apply any user selected global change to the perceptual attributes. Then, color correction unit 14 may apply color correction matrix 16 to the colors of the image. For example, color correction unit 14 may multiply color correction matrix 16 to the color values of the pixels of the image.

In accordance with the techniques described in this disclosure, color correction matrix 16 may be based on modified reference colors. For example, the user may have modified the reference colors to compensate for the reduction in saturation of certain colors due to the wideband color filters or the smaller color gamut. However, this is one example, and the user may have modified the reference colors for other reasons, such as for other perceptual attributes, as well as for examples where the display includes a larger or standard size color gamut. Accordingly, color correction matrix 16 may have built into it factors for adjusting the perceptual attributes of different colors by different amounts. For instance, as one example of adjusting the perceptual attributes, color correction matrix 16 may have built into it factors for compensating for the reduction in saturation of certain colors due to the wideband color filters or the smaller color gamut.

In this manner, when color correction unit 14 applies color correction matrix 16, color correction unit 14 may be configured to adjust perceptual attributes of the different colors by different amounts. For instance, color correction unit 14 may be configured to compensate for the reduction in saturation of certain color due to the wideband color filters or the smaller color gamut of a display.

For example, color correction matrix 16 may have built into it different amounts of perceptual attribute gain or offset factor for different colors. For instance, when color correction unit 14 applies color correction matrix 16 to input color values for pixels of the image, color correction unit 14 may apply different amounts of saturation gain to different colors so as to compensate for the changes in saturation for certain colors due to the wideband color filters or the smaller color gamut. As one example, the changes in the saturation for certain colors may be a reduction in the saturation level.

In accordance with techniques described in this disclosure, display device 10 may be considered as an apparatus that includes a display and at least display processor 12 may be configured to receive an image such as an input image generated by any of a video decoder, a camera processor, and a GPU, as a few non-limiting examples. For example, display processor 12 may receive input color values for pixels of an image. The input color values may represent different colors within the image.

Display processor 12 may include picture adjustment unit 18 that is configured to apply a global perceptual attribute gain or offset factor that adjusts perceptual attributes of different colors within the image by a same amount. Display processor 12 may also include color correction unit 14. Color correction unit 14 may be configured to apply correction matrix 16 to the input color values to compensate for deficiencies in an ability of a display of display device 10 to render colors represented by the input color values and to adjust perceptual attributes of the different colors by different amounts. In some examples, color correction unit 14 may be configured to multiply the color correction matrix with color values for pixels within the input image to apply the color correction matrix.

There may be different types of perceptual attribute adjustment. One example of the perceptual attribute adjustment may be to compensate for different amounts of reduction in the perceptual attributes of the different colors such as reduction in the saturation level for certain colors due to the wideband color filters or the smaller color gamut. However, a reduction in saturation level is not the only example of changes in the perceptual attributes. For example, some displays may provide a standard or a large color gamut. The techniques described in this disclosure may be extendable to increasing the saturation level for various colors for the displays with a standard or a large color gamut.

For example, the user of computing device 28 may utilize GUI 32 to modify the reference colors and determine color correction matrix 16 such that when color correction unit 14 applies color correction matrix 16, color correction unit 14 further increases the saturation. In this manner, for foliage colors, color correction unit 14 may further increase the saturation level resulting in a displayed image where the foliage colors appear even more intense, which results in better viewing experience.

In this manner, the techniques described in this disclosure may be applied to displays with a small color gamut or a large color gamut. For instance, the techniques may be considered as manipulating a color gamut of a display by using a color correction matrix that is generated from modified reference colors, where the modified reference colors are specifically modified for the purpose of allowing for variable adjustment of perceptual attributes.

For example, in accordance with the techniques described in this disclosure, color correction matrix 16 may be generated from modified reference colors (e.g., modified reference colors 42 or modified reference colors written/set in the registers of the convert block of display processor 12). In either example, the modified reference colors may be generated from reference colors 40 where perceptual attributes of different colors of reference colors 40 are modified by different amounts for adjusting perceptual attributes for the different colors within the input image.

As described above, one example of the perceptual attributes for the different colors within the input image may be a saturation value for each of the different colors within the input image. For example, the reduction in the perceptual attributes (e.g., the saturation) for the different colors in the input image may be due to at least one of a wideband color filter and a color gamut of the display.

Also, as described above, display processor 12 may receive color correction matrix from computing device 28. For example, display processor 12 may receive color correction matrix 16 from computing device 28 prior to user operation of display device 10 (e.g., off-line at the manufacturer or factory).

There may be various ways in which computing device 28 may generate color correction matrix 16. As one example, processor 30 may be configured to receive input, such as from a user via GUI 32, to modify at least one perceptual attribute of one of the reference colors by a first amount, and at least one perceptual attribute of another of the reference colors by a second, different amount to generate modified set of reference colors.

Processor 30 may then cause target display 36 or cause the convert block of display processor 12 to cause display processor 12 to render the modified set of reference colors. Processor 30 may determine a difference between outputted color values of the modified reference colors and color values of the reference colors. For example, colorimeter 38 may measure the color values of the rendered modified set of reference colors and output the measured color values to processor 30. Processor 30 may determine color correction matrix 16 based on the determined difference, and may store color correction matrix 16 in display device 10 (e.g., in display processor 12 of display device 10).

In some examples, the user may consider it desirable to modify reference colors 40 by different amounts for different display modes. For example, for a natural mode, the user may determine one set of modified reference colors, and for a standard mode, the user may determine another set of modified reference colors. In this example, processor 30 may determine a color correction matrix for the natural mode, and a different color correction matrix for the standard mode. Computing device 28 may upload both of these color correction matrices into display processor 12. Then, when display device 10 is on-line, color correction unit 14 may select the appropriate color correction matrix based on the selected display mode (e.g., select the color correction matrix associated with the natural mode when the display mode is the natural mode, or select the color correction matrix associated with the standard mode when the display mode is the standard mode).

Table 1 below illustrates example colors and color values of reference colors 40, and the modified color values of modified reference colors 42. For example, the user of computing device 28 may utilize GUI 32 to view the color values of reference colors 40, and may then utilize GUI 32 to modify the color values of reference colors 40 and generate modified reference colors 42. Table 1 also indicates the chroma expansion in the L*a*b space. The chroma expansion may indicate the amount by which the user adjusted the saturation level. The values provided in Table 1 are provided for illustration only, and should not be considered limiting.

TABLE 1

| Color | Reference Colors 40 | | | Modified Reference Colors 42 | | | Chroma expansion |
|---|---|---|---|---|---|---|---|
| | R | G | B | R | G | B | |
| Dark Skin | 44 | 21 | 14 | 12 | 31 | 5 | 100% |
| Light Skin | 140 | 77 | 56 | 190 | 65 | 31 | 100% |
| Blue Sky | 28 | 50 | 86 | 1 | 53 | 139 | 100% |
| Foliage | 26 | 38 | 13 | 16 | 42 | 1 | 100% |
| Blue flower | 57 | 56 | 110 | 46 | 52 | 179 | 100% |
| Bluish green | 32 | 132 | 104 | −1 | 142 | 102 | 50% |
| Orange | 182 | 51 | 7 | 216 | 42 | −2 | 35% |
| Purplish blue | 16 | 27 | 100 | −2 | 26 | 163 | 55% |
| Moderate red | 138 | 23 | 31 | 226 | −2 | 21 | 80% |
| Purple | 26 | 11 | 36 | 35 | 5 | 67 | 100% |
| Yellow green | 90 | 130 | 12 | 78 | 135 | −2 | 30% |
| Orange Yellow | 199 | 90 | 6 | 212 | 87 | −2 | 20% |
| Blue | 6 | 12 | 74 | −2 | 11 | 104 | 30% |
| Green | 16 | 77 | 16 | −2 | 83 | 4 | 45% |
| Red | 110 | 8 | 10 | 143 | −1 | 6 | 35% |
| Yellow | 218 | 146 | 2 | 218 | 146 | 2 | 0% |
| Magenta | 128 | 22 | 78 | 200 | −2 | 104 | 70% |
| Cyan | 0 | 63 | 98 | 0 | 63 | 98 | 0% |
| White 9.5 (.05 D) | 233 | 232 | 222 | 233 | 232 | 222 | Na |
| Neutral 8 (.23 D) | 148 | 150 | 148 | 148 | 150 | 148 | Na |
| Neutral 6.5 (.44 D) | 90 | 91 | 91 | 90 | 91 | 91 | Na |
| Neutral 5 (.70 D) | 48 | 49 | 49 | 48 | 49 | 49 | Na |
| Neutral 3.5 (1.05 D) | 22 | 23 | 23 | 22 | 23 | 23 | Na |
| Black | 8 | 8 | 8 | 8 | 8 | 8 | Na |

FIG. 4 is a block diagram illustrating an example of a device that may be configured to implement one or more techniques described in this disclosure. For example, FIG. 4 illustrates display device 10 of FIG. 1 in greater detail. For purposes of brevity, only the components of display device 10 that are illustrated in FIG. 4, but not illustrated in FIG. 1 are described in detail.

In the example of FIG. 4, display device 10 may include display processor 12, display 44, video decoder 46, graphics processing unit (GPU) 48, system memory 50, processor 52, transceiver module 54, and user interface 56. Processor 52 may be the central processing unit (CPU) of device 10. In some examples, display processor 12, processor 52, GPU 48, and video decoder 46 may be formed within a common integrated circuit (IC) chip. Alternatively, one or more of these processing units may be formed in separate IC chips, or any combination of common and separate chips.

Display device 10 may include additional modules or units not shown in FIG. 4 for purposes of clarity. As one example, display device 10 may include a camera. In such examples, display device 10 may be configured to implement camera processing pipelines. The techniques described in this disclosure with respect to picture adjustment unit 18 and color correction unit 14 may be applied to the camera processing pipeline as well because the camera processing pipeline may include a display processor with a picture adjustment unit and a color correction unit similar to those described in this disclosure.

As additional examples of modules or units not shown in FIG. 4 for purposes of clarity, display device 10 may include a speaker and a microphone, neither of which are shown in FIG. 4, to effectuate telephonic communications in examples where display device 10 is a mobile wireless telephone, or a speaker where display device 10 is a media player. Furthermore, the various modules and units shown in display device 10 may not be necessary in every example of display device 10. For example, user interface 56 and display 44 may be external to display device 10 in examples where display device 10 is a desktop computer or other device that is equipped to interface with an external user interface or display.

Examples of user interface 56 include, but are not limited to, a trackball, a mouse, a keyboard, and other types of input devices. User interface 56 may also be a touch screen and may be incorporated as a part of display 44. Transceiver module 54 may include circuitry to allow wireless or wired communication between display device 10 and another device or a network. Transceiver module 54 may include modulators, demodulators, amplifiers and other such circuitry for wired or wireless communication.

Display 44 may comprise a liquid crystal display (LCD), an organic light emitting diode display (OLED), a cathode ray tube (CRT) display, a plasma display, or another type of display device. Examples of system memory 50 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by the processing units of display device 10 includes display processor 12. In some examples system memory 50 may comprise one or more computer-readable storage media, such as a computer-readable storage device. For instance, in some example implementations, system memory 50 may include instructions that cause display processor 12 to perform the functions ascribed to display processor 12 in this disclosure.

System memory 20 may, in some examples, be considered as a non-transitory storage medium. The term "non-transitory" may indicate that the storage medium is not embodied in a carrier wave or a propagated signal. However, the term "non-transitory" should not be interpreted to mean that system memory 50 is non-movable. As one example, system memory 50 may be removed from display device 10, and moved to another device. As another example, a storage device, substantially similar to system memory 50, may be inserted into display device 10. In certain examples, a non-transitory storage medium may store data that can, over time, change (e.g., in RAM).

Figure 5:
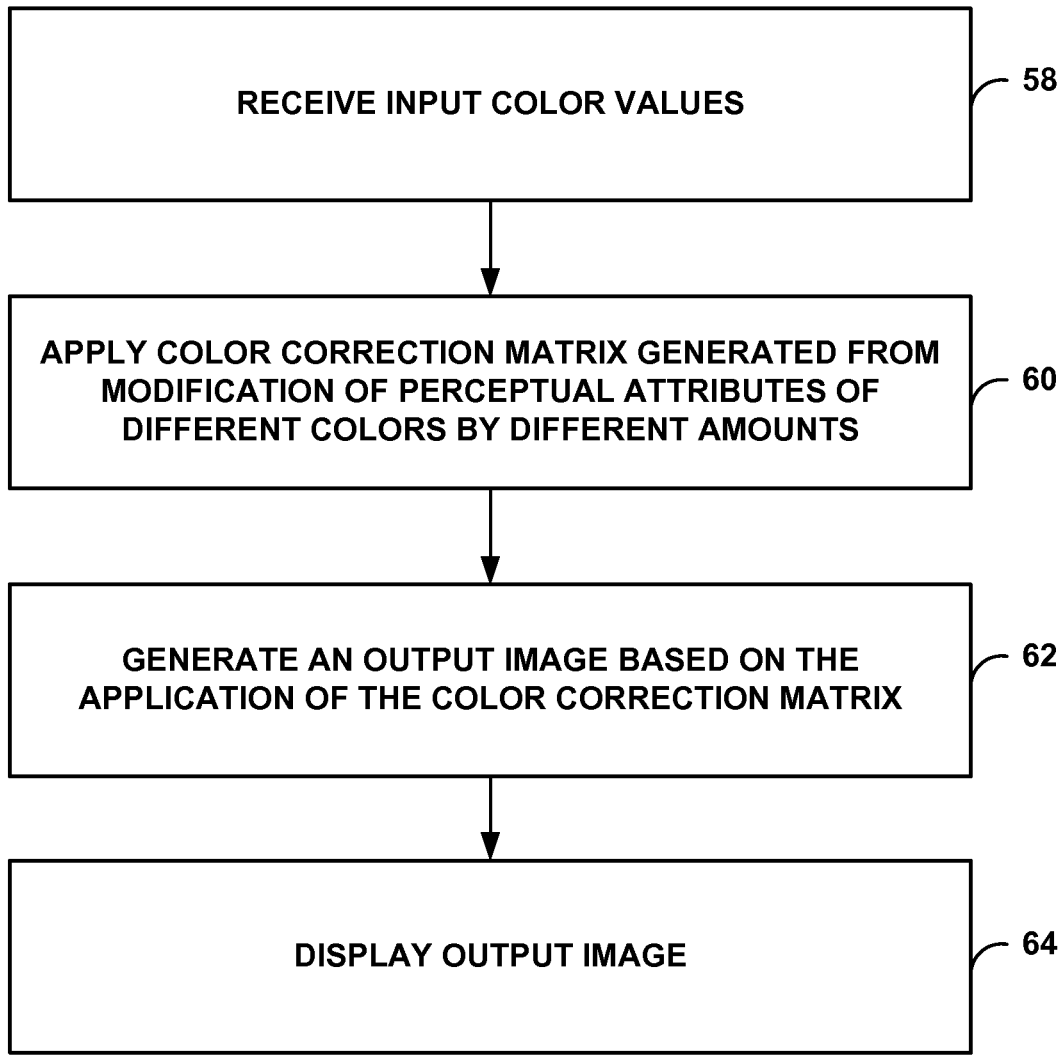
FIG. 5 is a flowchart illustrating an example operation in accordance with one or more example techniques described in this disclosure.

FIG. 5 is a flowchart illustrating an example operation in accordance with one or more example techniques described in this disclosure. For ease of illustration only, reference is made to FIGS. 1 and 4.

Display processor 12 may receive input color values for pixels within an image, where the input colors values represent different colors within the image (58). For example, any one of processor 52, video decoder 46, or GPU 48 may generate an image and store the image in system memory 50. The image may include a plurality of pixels, and each pixel may be associated with a color value. For example, a color value for a pixel may define the color, and the color values may represent the different colors that are within the image. These color values may form the input into display processor 12. For example, display processor 12 may receive the input color values from system memory 50.

Color correction unit 14 may apply color correction matrix 16 to the input color values to compensate for deficiencies in an ability of display 44 to render colors represented by the input color values and to adjust perceptual attributes of the different colors by different amounts (60). Color correction matrix 16 may be generated from reference colors where perceptual attributes of different colors of the reference colors are modified by different amounts for different amounts of adjustment in perceptual attributes of the different colors within the image. For example, color correction matrix 16 may be generated from reference colors whose perceptual attributes are modified by different amounts for compensating for the different amounts of reduction in perceptual attributes of different colors within the input image.

Display processor 12 may generate an output image based on the application of color correction matrix 16 to the input color values (62). Display processor 12 may display the output image on display 44 (64). In this manner, color correction unit 14 may compensate for the color rendering deficiencies of display 44 and provide variable perceptual attribute adjustment. Accordingly, where picture adjustment unit 18 provided global perceptual attribute adjustment, color correction unit 14 may be configured to provide variable perceptual attribute adjustment without needing any redesign of the hardware of color correction unit 14 or any redesign of display processor 12.

Figure 6:
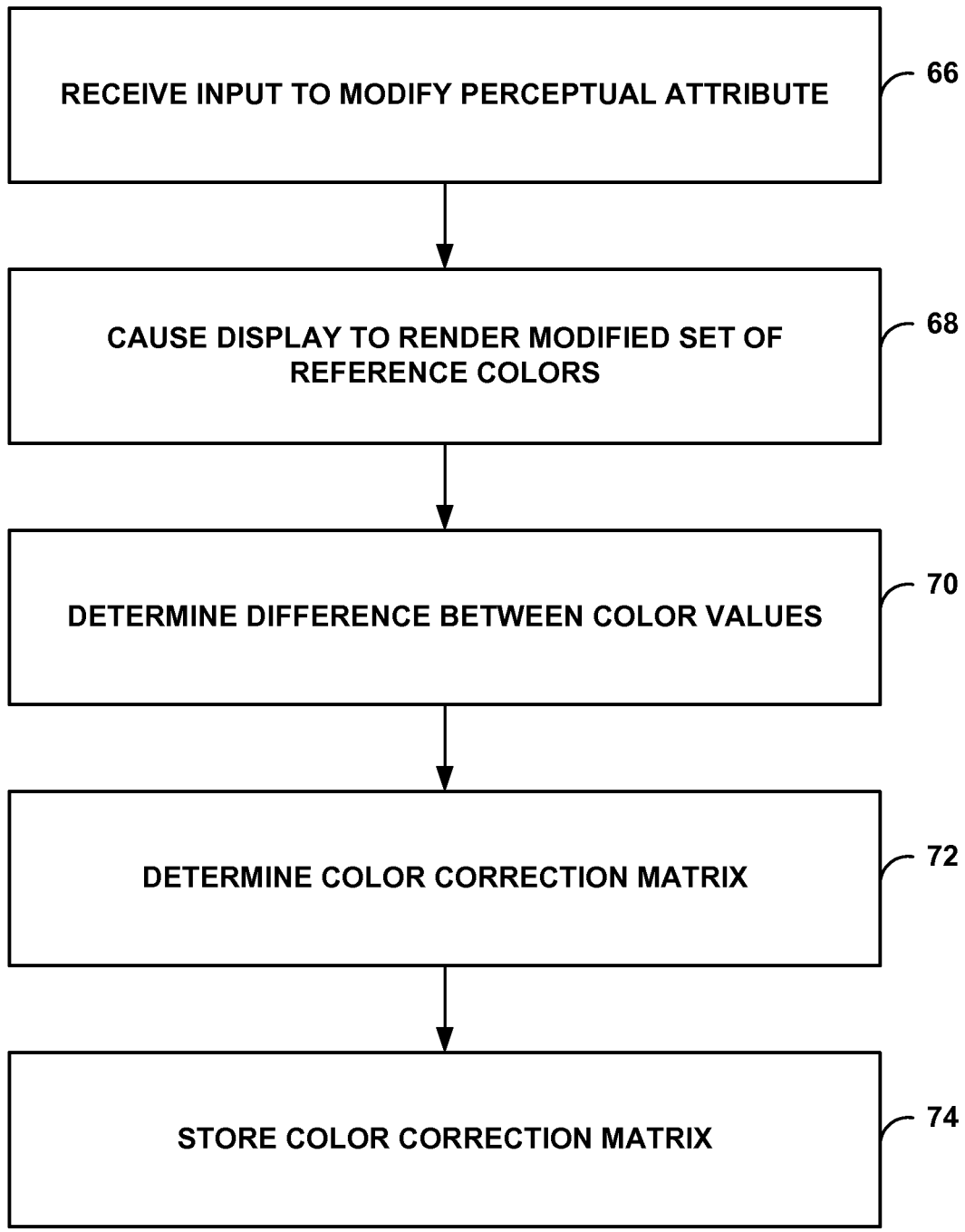
FIG. 6 is another flowchart illustrating an example operation in accordance with one or more example techniques described in this disclosure.

FIG. 6 is another flowchart illustrating an example operation in accordance with one or more example techniques described in this disclosure. For ease of illustration only, reference is made to FIGS. 1 and 3.

Processor 30 may receive input, such as from a user via GUI 32, to modify at least one perceptual attribute of one of the reference colors by a first amount, and at least one perceptual attribute of another of the reference colors by a second, different amount to generate a modified set of reference colors (e.g., modified reference colors 42) (66). Processor 30 may render the modified set of reference colors (68). For example, processor 30 may cause target display 36 to render the modified set of reference colors. As another example, processor 30 may write/set registers of the convert block of display processor 12 to cause display processor 12 to render the modified set of reference colors on display 44 of display device 10.

Processor 30 may determine a difference between color values of the rendered modified set of reference colors and color values of the modified set of reference colors (70). Processor 30 may determine color correction matrix 16 based on the determination (72). Processor 30 may store color correction matrix 16 in display device 10.

It is to be recognized that depending on the example, certain acts or events of any of the techniques described herein can be performed in a different sequence, may be added, merged, or left out altogether (e.g., not all described processes or events are necessary for the practice of the techniques). Moreover, in certain examples, processes or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, with a display processor, input color values for pixels of an image, wherein the input color values represent different colors within the image;
applying, with a color correction unit of the display processor, a color correction matrix to the input color values to compensate for deficiencies in an ability of a display to render colors represented by the input color values and to adjust perceptual attributes of the different colors by different amounts,
wherein the color correction matrix is generated from reference colors where perceptual attributes of different colors of the reference colors are modified by different amounts for different amounts of adjustment in perceptual attributes of the different colors within the image,
wherein the display processor is configured to apply a global perceptual attribute gain or offset factor, and
wherein the global perceptual attribute gain or offset factor adjusts the perceptual attributes of each of the different colors within the image by a same amount;
generating, with the display processor, an output image based at least in part on the application of the color correction matrix to the input color values; and
displaying the output image.

2. The method of claim 1, wherein, to adjust perceptual attributes of the different colors by different amounts comprises applying the color correction matrix to the input color values to compensate for different amounts of reduction in the perceptual attributes for the different colors.

3. The method of claim 2, wherein the reduction in the perceptual attributes for the different colors within the image is caused by at least one of a wideband color filter of the display and a color gamut of the display.

4. The method of claim 1,
wherein applying the color correction matrix comprises applying the color correction matrix after the display processor applies the global perceptual attribute gain or offset factor.

5. The method of claim 1, wherein the perceptual attributes for the different colors within the image comprises a saturation value for each of the different colors within the image.

6. The method of claim 1, wherein applying the color correction matrix comprises multiplying the color correction matrix with the input color values for the pixels of the image.

7. The method of claim 1, further comprising:
receiving the color correction matrix.

8. The method of claim 7, wherein receiving the color correction matrix comprises receiving the color correction matrix prior to user operation of a display device that includes the display processor.

9. An apparatus comprising:
a display; and
a display processor configured to receive input color values for pixels of an image, wherein the input color values represent different colors within the image, the display processor comprising:
a picture adjustment unit configured to apply a global perceptual attribute gain or offset factor, the global perceptual attribute gain or offset factor adjusts perceptual attributes of each of the different colors within the input image by a same amount; and
a color correction unit configured to apply a color correction matrix to the input color values to compensate for deficiencies in an ability of the display to render colors represented by the input color values and to adjust the perceptual attributes of the different colors by different amounts,
wherein the color correction matrix is generated from reference colors where perceptual attributes of different colors of the reference colors are modified by different amounts for different amounts of adjustment in perceptual attributes of the different colors within the image.

10. The apparatus of claim 9, wherein the color correction unit is configured to apply the color correction matrix to the input color values to compensate for different amounts of reduction in the perceptual attributes for the different colors.

11. The apparatus of claim 10, wherein the reduction in the perceptual attributes for the different colors within the image is caused by at least one of a wideband color filter of the display and a color gamut of the display.

12. The apparatus of claim 9, wherein the display processor is configured to generate an output image based on the application of the color correction matrix, and wherein the display is configured to display the output image.

13. The apparatus of claim 9, wherein the perceptual attributes for the different colors within the input image comprises a saturation value for each of the different colors within the input image.

14. The apparatus of claim 9, wherein the color correction unit is configured to multiply the color correction matrix with the input color values for the pixels of the image to apply the color correction matrix.

15. The apparatus of claim 9, wherein the display processor is configured to receive the color correction matrix.

16. The apparatus of claim 9, wherein the display processor is configured to receive the color correction matrix prior to user operation of the apparatus.

17. The apparatus of claim 9, wherein the apparatus comprises one of a digital television, a laptop computer, a desktop computer, a tablet computer, an e-book reader, a digital camera, a video gaming device, a video game console, a wireless handset, or a video teleconferencing device.

18. An apparatus comprising:
a display; and
a display processor that includes:
means for receiving input color values for pixels of an image, wherein the input color values represent different colors within the image;
means for applying a color correction matrix to the input color values to compensate for deficiencies in an ability of the display to render colors represented by the input color values and to adjust perceptual attributes of the different colors by different amounts,
wherein the color correction matrix is generated from reference colors where perceptual attributes of different colors of the reference colors are modified by different amounts for different amounts of adjustment in perceptual attributes of the different colors within the image;
means for applying a global perceptual attribute gain or offset, the global perceptual attribute gain or offset factor adjusts perceptual attributes of each of the different colors within the input image by a same amount;
means for generating, with the display processor, an output image based on the application of the color correction matrix to the input and, if applied, the global perceptual attribute gain or offset; and
means for displaying the output image on the display.

19. A non-transitory computer-readable medium having stored thereon instructions that when executed cause a display processor to:
- receive input color values for pixels of an image, wherein the input color values represent different colors within the image;
- apply, with a color correction unit of the display processor, a color correction matrix to the input color values to compensate for deficiencies in an ability of a display to render colors represented by the input color values and to adjust perceptual attributes of the different colors by different amounts,
- wherein the color correction matrix is generated from reference colors where perceptual attributes of different colors of the reference colors are modified by different amounts for different amounts of adjustment in perceptual attributes of the different colors within the image,
- wherein the display processor is configured to apply a global perceptual attribute gain or offset factor, and
- wherein the global perceptual attribute gain or offset factor adjusts the perceptual attributes of each of the different colors within the image by a same amount;
- generate an output image based at least in part on the application of the color correction matrix to the input color values; and
- display the output image.

20. A method comprising:
- receiving input to modify at least one perceptual attribute of one of a plurality of reference colors by a first amount, and at least one perceptual attribute of another of the reference colors by a second, different amount to generate a modified set of reference colors;
- causing a first display to render the modified set of reference colors;
- determining a difference between color values of the rendered modified set of reference colors and color values of the modified set of reference colors;
- determining a color correction matrix based on the determination,
- wherein the color correction matrix is to be applied by a display processor of a device to compensate for deficiencies in an ability of a second display of the device to render colors and to adjust perceptual attributes of different colors by different amounts, and
- wherein the display processor of the device is configured to apply a global perceptual attribute gain or offset factor, the global perceptual attribute gain or offset factor adjusts the perceptual attributes of each of the different colors by a same amount; and
- storing the color correction matrix in the device.

21. An apparatus comprising a processor configured to:
- receive input to modify at least one perceptual attribute of one of a plurality of reference colors by a first amount, and at least one perceptual attribute of another of the reference colors by a second, different amount to generate a modified set of reference colors;
- cause a first display to render the modified set of reference colors;
- determine a difference between color values of the rendered modified set of reference colors and color values of the modified set of reference colors;
- determine a color correction matrix based on the determination,
- wherein the color correction matrix is to be applied by a display processor of a device to compensate for deficiencies in an ability of a second display of the device to render colors and to adjust perceptual attributes of different colors by different amounts, and
- wherein the display processor of the device is configured to apply a global perceptual attribute gain or offset factor, the global perceptual attribute gain or offset factor adjusts the perceptual attributes of each of the different colors by a same amount; and
- store the color correction matrix in the device.

22. An apparatus comprising:
- means for receiving input to modify at least one perceptual attribute of one of a plurality of reference colors by a first amount, and at least one perceptual attribute of another of the reference colors by a second, different amount to generate a modified set of reference colors;
- means for causing a first display to render the modified set of reference colors;
- means for determining a difference between color values of the rendered modified set of reference colors and color values of the modified set of reference colors;
- means for determining a color correction matrix based on the determination,
- wherein the color correction matrix is to be applied by a display processor of a device to compensate for deficiencies in an ability of a second display of the device to render colors and to adjust perceptual attributes of different colors by different amounts, and
- wherein the display processor of the device is configured to apply a global perceptual attribute gain or offset factor, the global perceptual attribute gain or offset factor adjusts the perceptual attributes of each of the different colors by a same amount; and
- means for storing the color correction matrix in the device.

23. A non-transitory computer-readable medium having stored thereon instructions that when executed cause one or more processors to:
- receive input to modify at least one perceptual attribute of one of a plurality of reference colors by a first amount, and at least one perceptual attribute of another of the reference colors by a second, different amount to generate a modified set of reference colors;
- cause a first display to render the modified set of reference colors;
- determine a difference between color values of the rendered modified set of reference colors and color values of the modified set of reference colors;
- determine a color correction matrix based on the determination,
- wherein the color correction matrix is to be applied by a display processor of a device to compensate for deficiencies in an ability of a second display of the device to render colors and to adjust perceptual attributes of different colors by different amounts, and
- wherein the display processor of the device is configured to apply a global perceptual attribute gain or offset factor, the global perceptual attribute gain or offset factor adjusts the perceptual attributes of each of the different colors by a same amount; and
- store the color correction matrix in the device.

* * * * *